United States Patent
Suzuki

(10) Patent No.: US 7,502,549 B2
(45) Date of Patent: Mar. 10, 2009

(54) REPRODUCING APPARATUS

(75) Inventor: Toshihiko Suzuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 895 days.

(21) Appl. No.: 10/735,649

(22) Filed: Dec. 16, 2003

(65) Prior Publication Data

US 2004/0126089 A1 Jul. 1, 2004

(30) Foreign Application Priority Data

Dec. 26, 2002 (JP) ............... 2002-378214

(51) Int. Cl.
*H04N 5/00* (2006.01)
(52) U.S. Cl. .................................... 386/124
(58) Field of Classification Search .............. 386/106, 386/125–126, 46, 33, 45, 95, 124
See application file for complete search history.

(56) References Cited

U.S. PATENT DOCUMENTS

| 5,331,421 | A | | 7/1994 | Ohzu et al. ............... 340/262 |
| 5,687,160 | A | * | 11/1997 | Aotake et al. ............ 369/275.3 |
| 5,737,016 | A | | 4/1998 | Ohzu et al. ............... 348/241 |
| 5,745,783 | A | | 4/1998 | Suzuki et al. ............. 395/825 |
| 5,751,887 | A | * | 5/1998 | Nitta et al. ................ 386/68 |
| 5,949,955 | A | * | 9/1999 | Nakai ........................ 386/106 |
| 5,973,680 | A | | 10/1999 | Ueda ......................... 345/327 |

FOREIGN PATENT DOCUMENTS

| JP | 7-14369 | 1/1995 |
| JP | 8-194982 | 7/1996 |
| JP | 08-221432 | 8/1996 |
| JP | 8-221954 | 8/1996 |
| JP | 9-259504 | 10/1997 |
| JP | 10-293689 | 11/1998 |
| JP | 11-203051 | 7/1999 |
| JP | 11-296862 | 10/1999 |
| JP | 2000-125239 | 4/2000 |
| JP | 2001-54042 | 2/2001 |
| JP | 2001-231014 | 8/2001 |
| JP | 2002-245754 | 8/2002 |

* cited by examiner

*Primary Examiner*—Thai Tran
*Assistant Examiner*—Tat Chi Chio
(74) *Attorney, Agent, or Firm*—Fitzpatrick, Cella, Harper & Scinto

(57) ABSTRACT

A reproducing apparatus displays representative images of clips recorded on a recording medium in list form, reproduces part of data after a front end of the clip corresponding to the representative image selected from among the displayed representative images from the recording medium to store the part of the data in a memory, and starts readout of the part of data stored in the memory in response to a reproduction start instruction.

15 Claims, 15 Drawing Sheets

REPRODUCING APPARATUS

BACKGROUND OF THE INVENTION

1. Field of the Invention

The present invention relates to a reproducing apparatus, particularly relates to the apparatus which reproduces an information signal recorded on a recording medium.

2. Description of the Related Art

In recent years, greater density and larger capacity in a disk-shaped recording medium are rapidly proceeding. A recording and reproducing apparatus in which not only a sound signal but also a still image signal or moving image (video) signal can be finely recorded for long time on the disk-shaped recording medium and a recording signal can be reproduced from the disk-shaped recording medium has been proposed.

In such recording and reproducing apparatuses, since a size of the disk-shaped recording medium itself is being miniaturized, compared with the conventional recording and reproducing apparatus using a tape-shaped recording medium, further miniaturization has been achieved, rapid and random data-access advantage has been realized, and remarkable improvement in functions with respect to easy portability of the disk-shaped recording medium, high reliability, low cost, search readiness in operation, and the like has been accomplished.

Reproducing operation of the recording and reproducing apparatus using the conventional disk-shaped recording medium will be described below referring to FIG. 15. In FIG. 15, a reproduction trigger unit 1101 outputs a reproduction start instruction in response to user's operation. Then, in a mechanical servo control unit 1102, access processing such as seek to a target address on the disk-shaped recording medium is performed by servo mechanism control on the basis of the reproduction instruction. In advance to the reproduction, a reproduction parameter setting unit 1103 optimizes such a reproduction parameter such as reproducing laser power on the like. A data detection unit 1104 performs such processing as predetermined gain control, waveform equalization, digitalization, and clock extraction on the reproduced data. A demodulation ECC unit 1105 performs error correction on the reproduced data after performing predetermined demodulating processing.

After the error correction processing, the reproduced data is sequentially written into a memory 1106. The data is read out from the memory 1106 at a rate slower than writing rate and transmitted to a decoder 1107 of the next stage.

Access operation to the memory 1106 will be described below referring to FIG. 16. FIG. 16 shows time-progression of the amount of data in the memory 1106 and write and readout timing signals. After the reproduction trigger unit 1101 outputs the reproduction instruction at a time t0, the data is written in the memory 1106 between a time t1 and a time t2. The data readout from the memory 1106 is started at the time t2 when the data is accumulated up to a predetermined memory amount "a", and the data readout is continued until a time t3 when the data reaches to a predetermined memory amount "b". Then, the processing, in which the data is written between the time t3 and a time t4 and the data is read out between the time t4 and a time t5, is repeated.

The decoder 1107 expands and decodes compression encoded data which is read out from the memory 1106. A video output processing unit 1108 converts the decoded data into a video signal pursuant to a predetermined output format and outputs the video signal to a display system or an external signal terminal.

As described above, the reproducing processing sequentially proceeds after receiving the reproduction start instruction in the reproducing operation of the conventional recording and reproducing apparatus using the disk-shaped recording medium. However, it considerably takes time to output actually the desired video image. Physical access time to the disk-shaped recording medium by using the mechanical servo control, and buffering time in which an intermittent and high-speed read signal obtained from the disk-shaped recording medium is temporarily stored and decoded at a predetermined transmission rate, are main factors of such the waiting time.

Some proposals for decreasing the waiting time in the reproducing operation have been made. For example, in Japanese Patent Application Laid-Open No. H08-194982, there has been made the proposal which decreases the physical access waiting time in such a manner that individual memory spaces are previously secured for a plurality of the information data recorded on the disk-shaped recording medium respectively, the reproduced data having a certain quantity from a front end is accumulated in the memory space, and the selected information data is read out from the memory in response to the reproduction start instruction.

In Japanese Patent Application Laid-Open No. H11-296862, there has been made the proposal which decreases the buffering waiting time by monitoring an amount of write data into the memory and outputting the data from the memory at a time when the minimum data required for the reproduction is secured.

However, even if configurations described in Japanese Patent Application Laid-Open No. H08-194982 and the like are applied to the conventional recording and reproducing apparatus, there are the following problems in the conventional recording and reproducing apparatus.

At first, when the data recorded on the disk-shaped recording medium is the long-time moving image data, unlike music data, a specific start position such as "the front end of a piece of music" can not be previously designated. Further, as the larger capacity of the disk-shaped recording medium proceeds, the conventional recording and reproducing apparatus could not deal with a situation in which the enormous amounts of data to be previously secured in the memory have swelled.

When writing the data in the memory and reading the data from the memory are dynamically controlled as taught by Japanese Patent Application Laid-Open No. H11-296862, it can not be avoided that quality in buffering function with which the apparatus should be primarily provided is degraded. That is to say, for disturbance such as shock and vibration which are unavoidable for the use of the apparatus in mobile environment, shock-proof function maintaining the continuousness of the data is forced to be traded off for decreased waiting time. Particularly, even if the speed-up is attained only by focusing on readout timing, the problems such as speed-up of the physical access to the disk-shaped recording medium and other functions still remain.

SUMMARY OF THE INVENTION

In view of the foregoing, it is an object of the invention to solve these problems.

It is another object of the invention to reproduce rapidly and correctly desired data recorded on the recording medium by using a memory having small capacity.

In order to achieve the above-mentioned objects, according to an aspect of the present invention, a reproducing apparatus of the present invention comprises reproducing means for reproducing image data of a plurality of contents from a recording medium and writing the reproduced image data in a memory, displaying means for displaying a plurality of representative images of the plurality of contents on the same screen, selecting means for selecting a desired representative image from among the plurality of representative images displayed on the same screen, reproduction instruction means for instructing reproduction start of the contents corresponding to the selected representative image, reproduction processing means for reading out the image data stored in the memory and outputting the image data as reproduced image data, and controlling means for controlling the reproducing means in response to selecting operation by the selecting means so that the reproducing means reproduces a part of the image data of the contents concerning the selected representative image and writes the part of the image data in the memory, the controlling means controlling the reproduction processing means in response to the reproduction start instruction by the reproduction instruction means so that the reproduction processing means starts readout of the part of the image data from the memory.

The above and other objects and features of the invention will be apparent from the following detailed description of aspects of the invention referring to the accompanying drawings.

DESCRIPTION OF THE PREFERED EMBODIMENTS

Preferred embodiments of the invention will be described below referring to the accompanying drawings.

First Embodiment

The invention is applicable to, for example, an image pickup recording and reproducing apparatus (combination video camera and videocassette recorder system, so-called camcoder) 200. The overall configuration and a series of operations of the image pickup recording and reproducing apparatus 200

Figure 1:
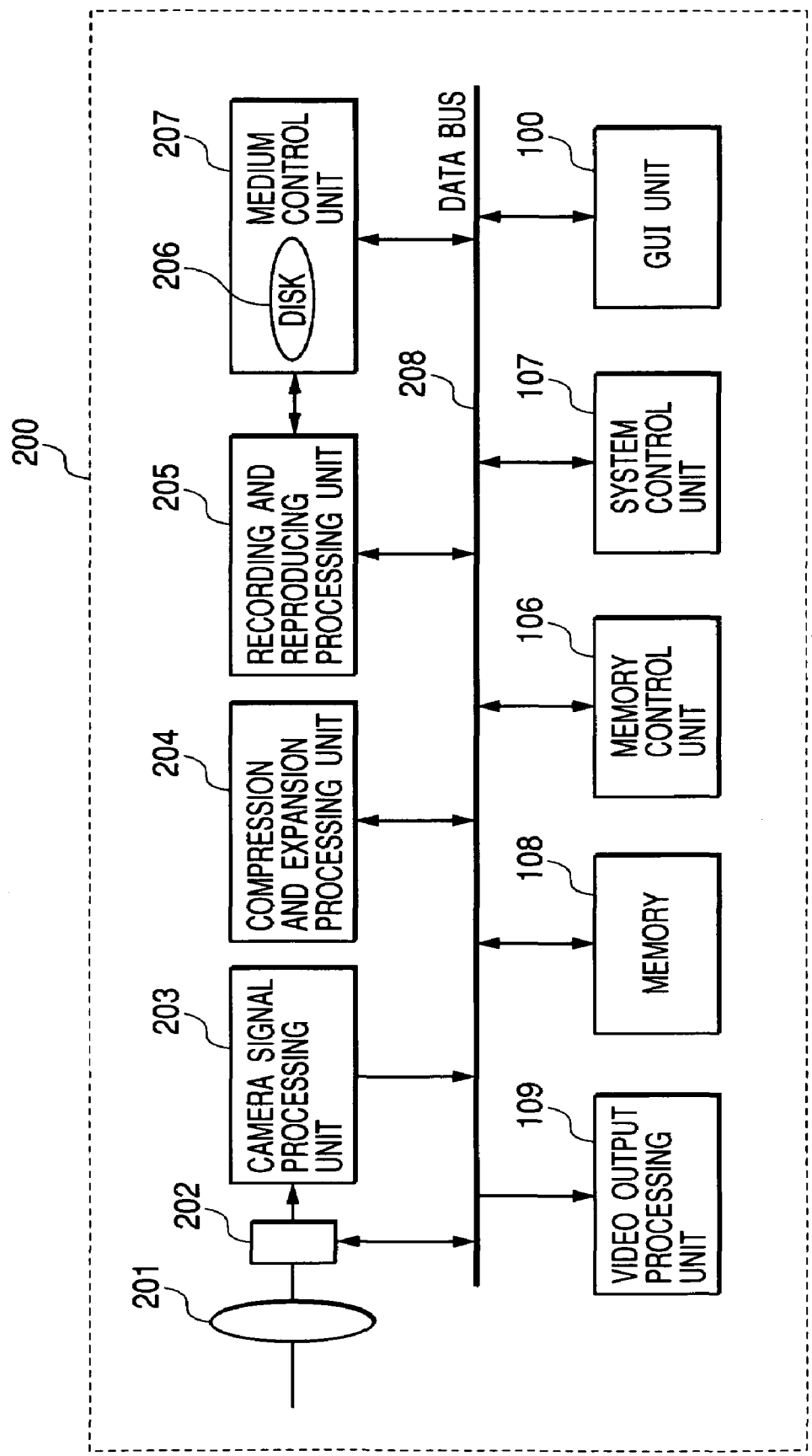
FIG. 1 is a functional block diagram showing overall function of an image pickup recording and reproducing apparatus.

The image pickup recording and reproducing apparatus 200 can pick up, record, and reproduce a moving image. As shown in FIG. 1, the image pickup recording and reproducing apparatus 200 includes an optical control system lens group 201 having an optical control system such as focusing and zooming, a diaphragm 202, a camera signal processing unit 203, a compression and expansion processing unit 204, a recording and reproducing processing unit 205, a recording medium (e.g., a disk) 206, a medium control unit 207, a graphical user interface (hereinafter referred to as GUI unit) 100, a memory control unit 106, a system control unit 107, a memory 108, and a video output processing unit 109.

The diaphragm 202, the camera signal processing unit 203, the compression and expansion processing unit 204, the recording and reproducing processing unit 205, the medium control unit 207, the GUI unit 100, the memory control unit 106, the system control unit 107, the memory 108, and the video output processing unit 109 are connected to one another through a data bus 208 so as to be able to communicate with one another.

In the image pickup recording and reproducing apparatus 200, the memory 108 is memory space which is used by each functional block uses in a time-shared manner through the data bus 208, and the memory 108 is controlled and managed by the memory control unit 106.

The memory 108 is also used as a buffer memory (shock-proof memory) for performing prereproduction processing described hereinafter.

The system control unit 107 controls the whole of image pickup recording and reproducing apparatus 200 by executing a predetermined program and the like.

The GUI unit 100 is an interface between a user and the image pickup recording and reproducing apparatus 200. The GUI unit 100 directs the system control unit 107 to perform the operation in response to user's key operation and the like. For example, when the GUI unit 100 instructs the system control unit 107 to perform image pickup operation and recording operation, light from an object (not shown) is converted into an optical signal, in which predetermined brightness, angle of view, focus, and the like are controlled by the optical system lens group 201 and the diaphragm 202, to be input to the camera signal processing unit 203.

The camera signal processing unit 203 converts the input optical signal into an electric signal with CCD, converts the electric signal into a continuous image signal by performing sampling and charge hold, and performs signal processing such as color separation, gradation correction, and white balance adjustment on the image signal. Then, the camera signal processing unit 203 outputs the post-signal processing image signal in the form of image pickup data and writes the image pickup data in the memory 108 through the data bus 208.

The compression and expansion processing unit 204 compression-codes the image data, which is output from the camera signal processing unit 203 and written in the memory 108, by using a predetermined compression encoded method and writes the compression-coded image data in a predetermined area of the memory 108 again.

The recording and reproducing processing unit 205 performs error-correcting coding, modulation processing, and the like on the image data, which is compression-coded and written in the memory 108 by the compression and expansion processing unit 204, converts the image data into the form suitable for recording the image data on the disk 206, and records the image data in the disk 206 through the medium control unit 207.

When the GUI unit 100 instructs the system control unit 107 to perform reproducing operation, the recording and reproducing processing unit 205 demodulates the data read out from the disk 206 to detect the original digital data, performs error-correcting processing on the digital data, and writes the digital data in the memory 108 through the data bus 208.

The compression and expansion processing unit 204 reads out the image data, which is reproduced by the recording and reproducing processing unit 205, from the memory 108, decodes the image data to expand information quantity of the image data, and then writes the image data in the memory 108 again.

The video output processing unit 109 not only displays the image pickup data or the reproduced image data, which is written in the memory. 108 from the camera signal processing unit 203, operating status of the image pickup recording and reproducing apparatus 200, and the like on a screen of the GUI unit 100, but also outputs the image pickup data or the reproduced image data, the operating status of the image pickup recording and reproducing apparatus 200, and the like to an external output terminal on the basis of a predetermined output format.

In the present embodiment, while the memory 108 is used for the compression and expansion processing in recording and reproducing the data, part of the memory 108 is also used for both the later-mentioned prereproduction processing and the shock-proof memory function for recording and reproducing processing, which is provided to the disk 206 by the recording and reproducing processing unit 205.

The overall configuration and a series of operations of the recording medium 206 and the medium control unit 207

Figure 2:
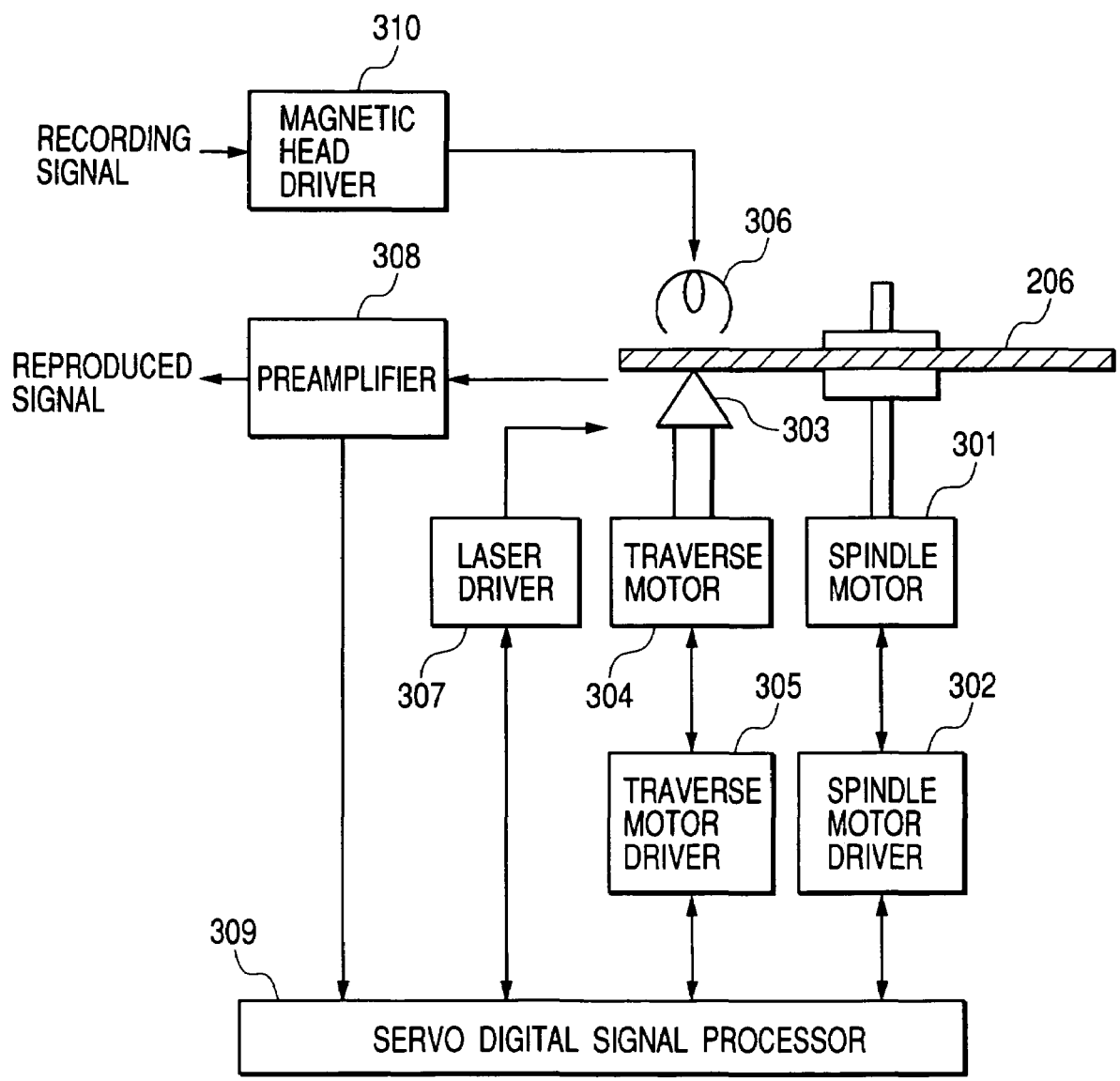
FIG. 2 is a block diagram showing a configuration of a disk drive apparatus.

FIG. 2 shows a configuration of the disk 206 and the medium control unit 207. A magneto-optical disk is used for such the disk 206 as DVD in the present embodiment.

The medium control unit 207 functions as s disk drive. As shown in FIG. 2, the medium control unit 207 includes a spindle motor 301, a spindle motor driver 302, an optical pickup 303, a traverse motor 304, a traverse motor driver 305, a magnetic head 306, a laser driver 307, a preamplifier 308, a servo DSP (Digital Signal Processor) 309, and a magnetic head driver 310.

In the medium control unit 207, while the servo DSP 309 performs predetermined servo-rotation on the disk 206 by controlling the spindle motor 301 through the spindle motor driver 302, the servo DSP 309 causes the optical pickup 303 to trace a predetermined track of the disk 206 by driving and controlling the traverse motor 303 through the traverse motor driver 305. The servo DSP 309 also performs focus control and tracking control by controlling an actuator of the optical pickup 303.

In the operation of reproducing the data from the disk 206, the laser driver 307 irradiates the disk 206 with a laser beam having predetermined reproducing power, detects reflected light quantity difference from the disk 206, and performs optoelectric conversion of the reflected light to obtain a reproduced electric signal corresponding to reflected light and output the reproduced electric signal to the preamplifier 308.

The preamplifier 308 amplifies the input reproduced electric signal to a predetermined signal level, performs matrix processing and the like on the amplified signal, and outputs the signal. The signal output from the preamplifier 308 is supplied to the recording and reproducing processing unit 205 shown in FIG. 1, and the recording and reproducing processing unit 205 performs the above-mentioned processing on the signal.

In the operation of recording the data on the disk 206, the laser driver 307 pulse-modulates predetermined recording power to irradiate the disk 206. At the same time, the magnetic head driver 310 applies a recording modulation magnetic field to the disk 206 with the magnetic head 306 and records magnetic information on the disk 206, on the basis of the data (recording modulation signal) which has been processed by the recording and reproducing processing unit 205 shown in FIG. 1.

Reproducing Operation in the Image Pickup Recording and Reproducing Apparatus 200

Figure 3:
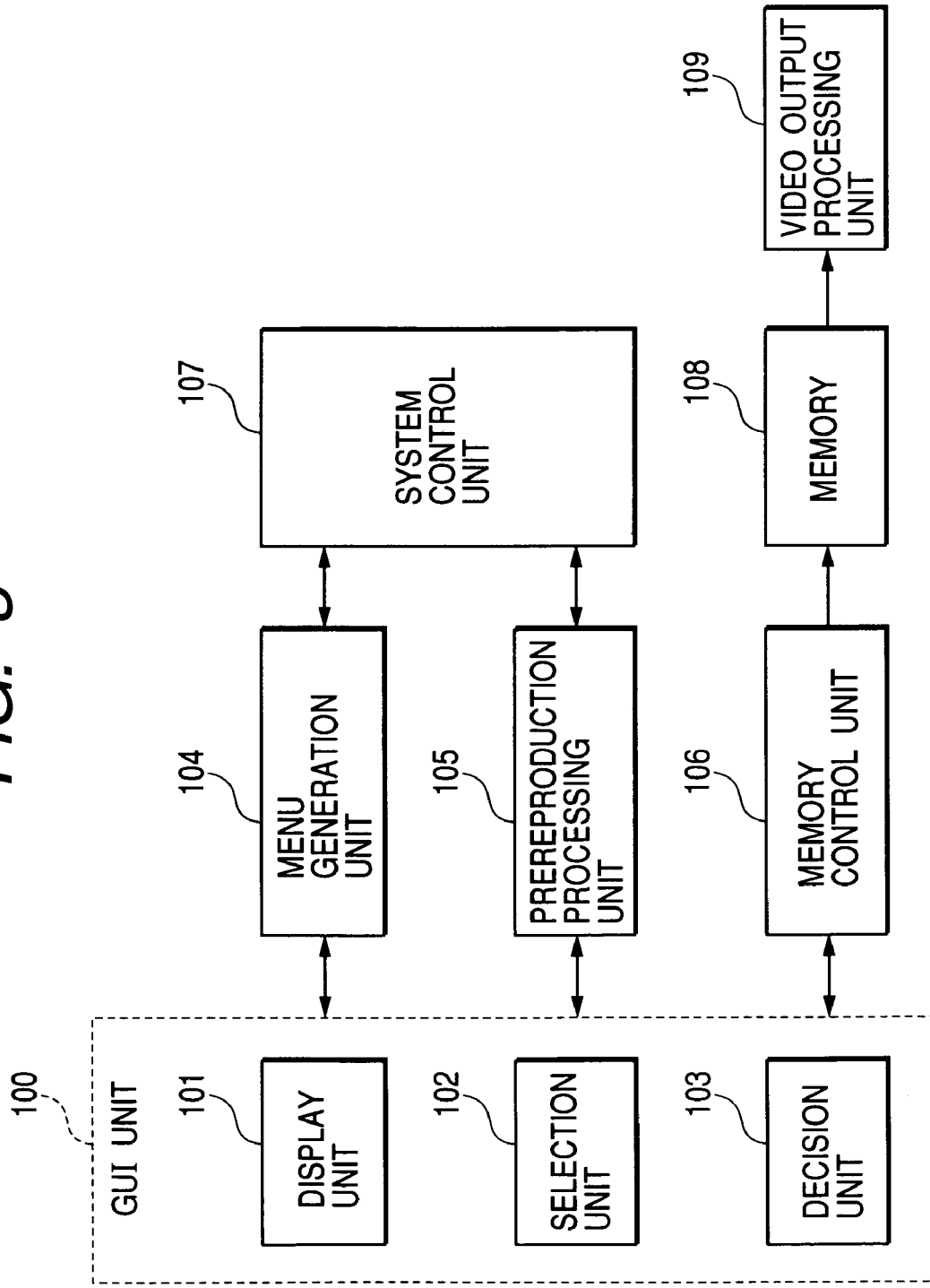
FIG. 3 is a functional block diagram showing a prereproduction processing function.

FIG. 3 is a functional block diagram showing a prereproduction processing function in the image pickup recording and reproducing apparatus 200.

As shown in FIG. 3, the image pickup recording and reproducing apparatus 200 includes the GUI unit 100, the menu generation unit 104, the prereproduction processing unit 105, the memory control unit 106, the system control unit 107, the memory 108, and video output processing unit 109, which have been already shown in FIG. 1. The GUI unit 100 includes a display unit 101, selection unit 102, and decision unit 103.

The image pickup recording and reproducing apparatus 200 is equipped with a microcomputer (not shown) mainly including CPU, ROM, and RAM. The microcomputer realizes all the functions or a part of the functions of the above GUI unit 100, menu generation unit 104, prereproduction processing unit 105, memory control unit 106, system control unit 107, video output processing unit 109, camera signal processing unit 203, compression and expansion processing unit 204, recording and reproducing processing unit 205, and medium control unit 207.

Figure 6:
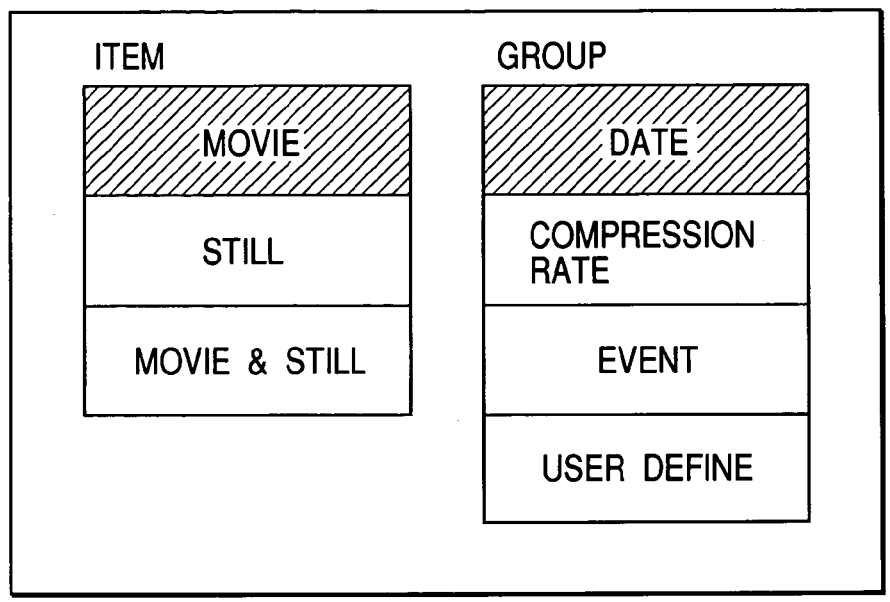
FIG. 6 shows an example of a GUI screen for setting initial values of a reproduction menu.

The system control unit 107 can previously reproduce disk management information including information such as a recording address of each clip recorded in the disk 206 and a file name of the clip contained in each group settable in initial setting shown in FIG. 6, during mounting the disk 206 or power-up and store the disk management information in the predetermined area of the memory 108, and the system control unit 107 can confirm and reproduce the recording address of the front-end image data of each group on the basis of the disk management information in the prereproduction processing.

Figure 4:
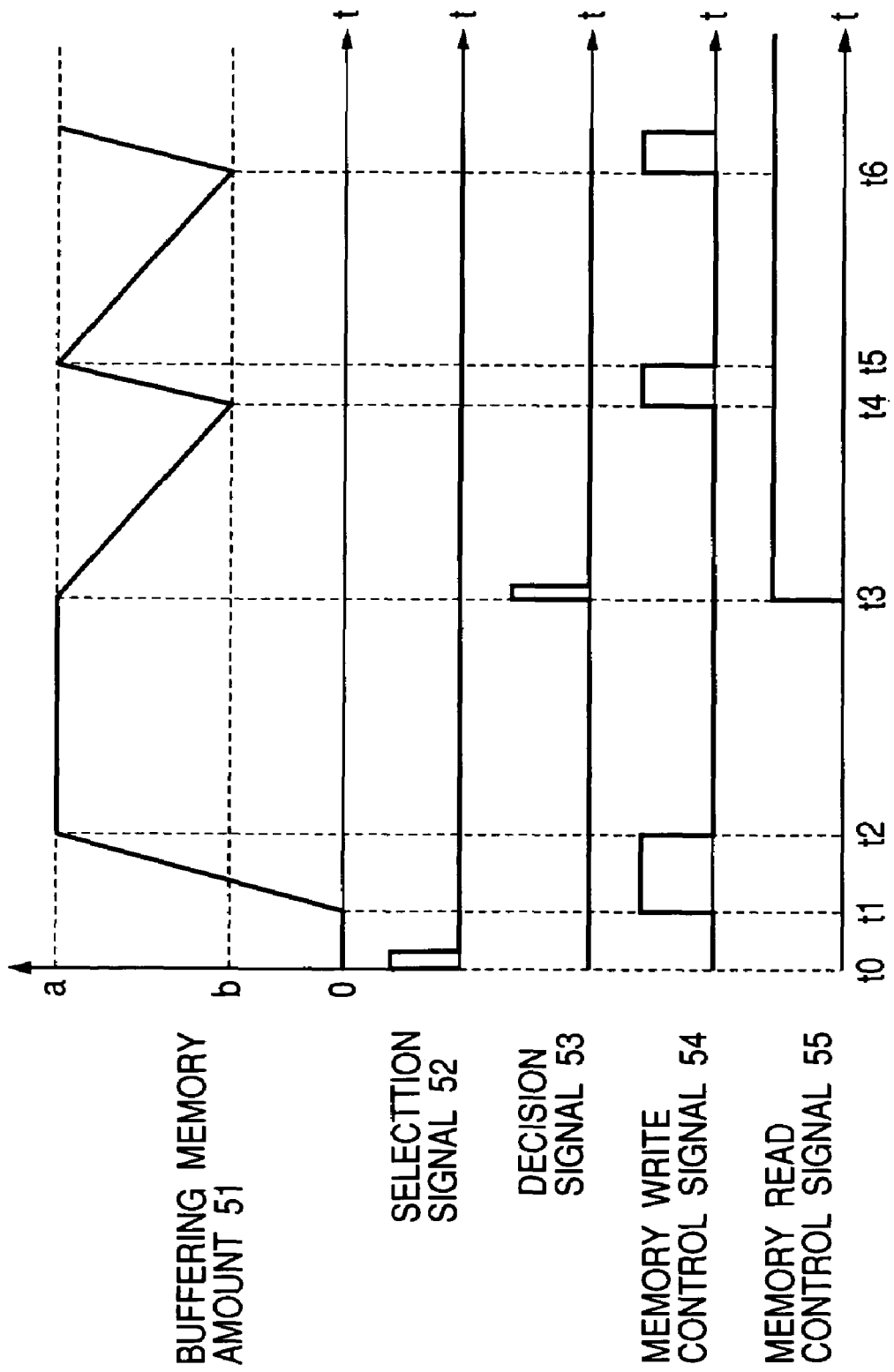
FIG. 4 is a timing chart showing prereproduction processing in a first embodiment.

FIG. 4 is a timing chart showing the operation of the prereproduction processing unit 105 shown in FIG. 3. In FIG. 4, a reference numeral 51 denotes time-progression of the data amount in the memory 108, a reference numeral 52 denotes a selection signal obtained from the selection unit 102 in the GUI unit 100, a reference numeral 53 denotes a decision signal obtained from decision unit 103 in the GUI unit 100, a reference numeral 54 denotes a data write control signal supplied to the memory control unit 106, and a reference numeral 55 denotes a data read control signal supplied to the memory control unit 106.

When the prereproduction processing unit 105 receives the selection signal 52 from the GUI unit 100 at the time t0, the prereproduction processing unit 105 gives a reproduction start instruction to the system control unit 107. The system control unit 107 starts data reproducing operation toward a designated address, terminates physical access to the predetermined address at time t1, and sequentially reproduces the data.

A timing of writing into the memory 108 during the reproduction is in the range from the time t1 to the time t2 as shown in the data write control signal 54, and the reproduction data corresponding to the predetermined amount "a" is accumulated in the memory 108. The system control unit 107 monitors the memory amount in the memory 108. When the memory amount reaches the predetermined amount "a", the system control unit 107 terminates the data writing into the memory 108 and becomes, in a standby status.

The predetermined amount "a" indicates the memory amount in the area where the memory can be utilized as buffer memory for prereproduction (hereinafter referred to as prereproduction area) among the whole memory capacity of the memory 108.

When the prereproduction processing unit 105 receives the decision signal 53 from the GUI unit 100 at the time t3, the prereproduction processing unit 105 instructs the system control unit 107 to read out the designated information from the memory 108. Then, the system control unit 107 instructs the memory control unit 106 to perform data readout from the memory 108, and the memory control unit 106 reads out the reproduced data from the memory 108 according to the memory read control signal 55. Then, the system control unit 107 reproduces and outputs the reproduced data according to the memory write control signal 54 and the memory read control signal 55, while buffering the reproduced data in the memory 108.

Figure 5:
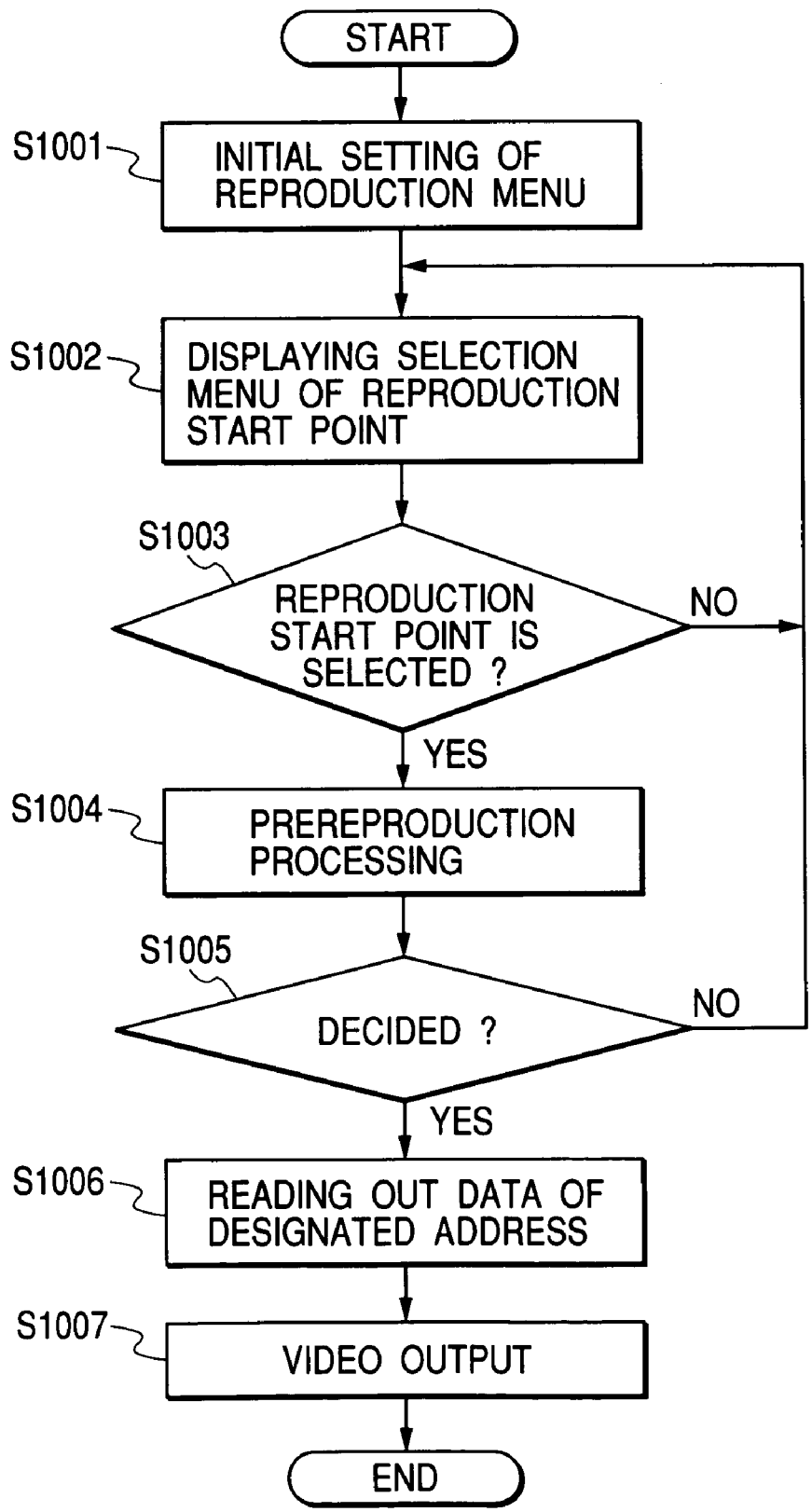
FIG. 5 is a flow chart showing the prereproduction processing in the first embodiment.

FIG. 5 is a flow chart showing the prereproduction processing according to the first embodiment.

STEP S1001: Setting the Initial Value in the Menu Generation Unit 104

In the present embodiment, when image contents recorded in the disk 206 are reproduced, thumbnail images of the contents recorded in the form of a menu are displayed in list form by operating the GUI unit 100. The reproduction of the image data is started by the reproduction start instruction after selecting the thumbnail of the desired contents among the thumbnail images displayed in list form.

At this point, the user can arbitrarily set the kinds of contents displayed as a menu screen.

FIG. 6 shows a GUI screen for setting the initial values of the kinds of contents displayed on the menu screen.

In the GUI screen shown in FIG. 6, one of MOVIE, STILL, and MOVIE and STILL can be initially set for an item of the contents displayed on the reproduction menu screen. A date, a recording rate, an event, user definition, and the like can be initially set for a group of the displayed contents.

At this point, the recording rate means a compression rate with which the user records the picked-up image. For example, when a coding algorithm such as MPEG is used, the compression rate means distinction among HD (not lower than 18 Mbps), fine (equivalent to 14 Mbps), standard (equivalent to 9 Mbps), and the like. The event means group classification of each event on the basis of a keyword such as "a sports festival", "travel", and "a recital" for a photographing record.

STEP S1002: Reproduction Start Point Selection Menu Display

The GUI menu for selecting a reproduction start point (contents) is displayed on the display unit 101 of the GUI unit 100.

Figure 7:
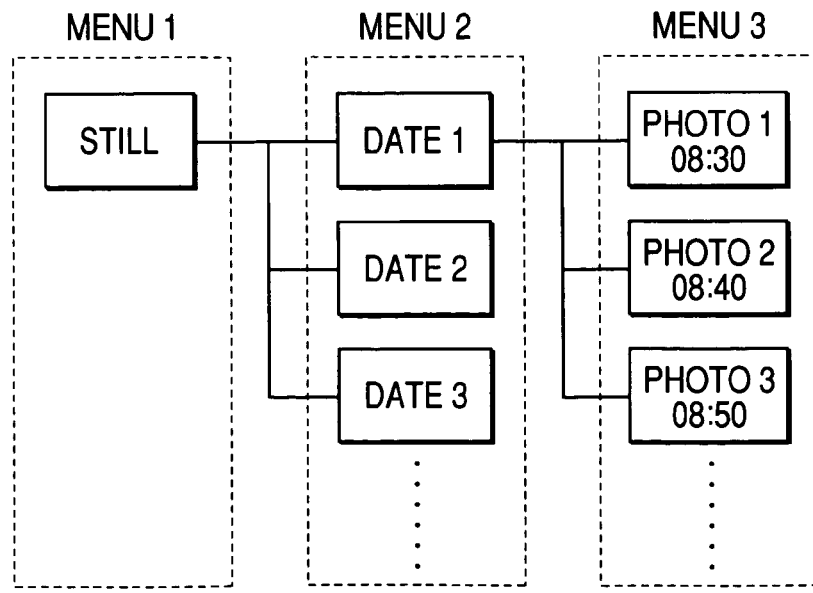
FIG. 7 shows an example of a hierarchy of the reproduction menu.

FIG. 7 shows an example of a hierarchy of the reproduction menu when the initial setting of the display item is a still image. The menu screen of the item still image is displayed as MENU 1 in FIG. 7. The menu screen can be transferred between hierarchal menus such as MENU 2 and MENU 3 by operating the selection unit 102 of the GUI unit 100. The menu screen in which the initial setting of the group is DATE is displayed in MENU 2 of FIG. 7, and in MENU 3 which is the lower hierarchy of a specified date and time (DATE 1), the menu screen of still image files (PHOTO 1, PHOTO 2, . . . ) taken at that specific date and time is displayed.

Figure 8:
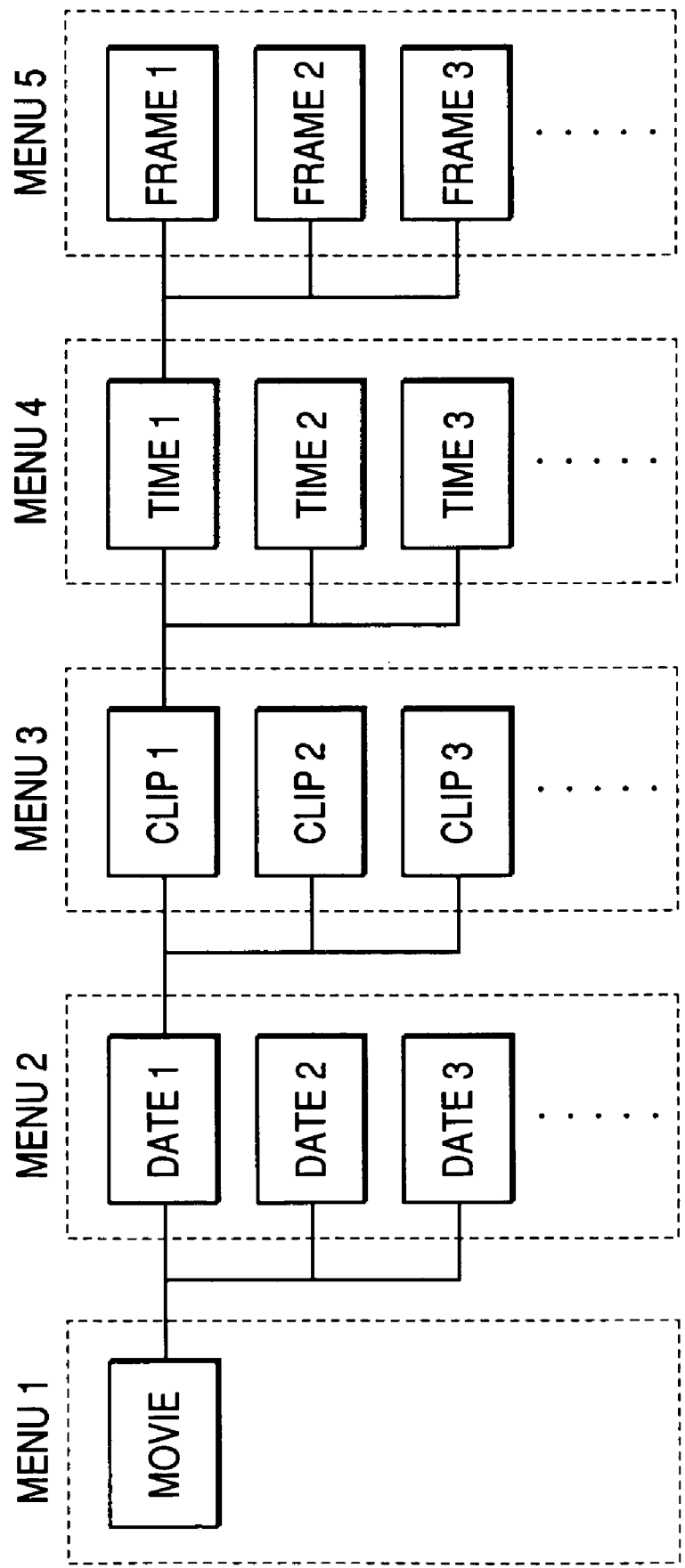
FIG. 8 shows an example of the hierarchy of the reproduction menu.

FIG. 8 shows an example of a hierarchy of the reproduction menu when the initial setting of the display item is a moving image. The menu screen of the item moving image is displayed as MENU 1 in FIG. 8. The menu screen can be transferred between hierarchal menu such as the MENU 2 and MENU 3 by operating the selection unit 102 of the GUI unit 100. The menu screen in which the initial setting of the group is DATE is displayed in MEMU 2, and in the lower hierarchy of a specified date and time (DATE 1), the menu screen of moving image clips (CLIP 1, CLIP 2, . . . ) taken at that specific date and time is displayed.

The clip is a series of sets of the images, which has the meaning as the moving image, and the data showing a series of moving images from a recording start to a recording end is recorded as one clip in the present embodiment.

The menu screen can be displayed by unit of time as the further lower hierarchy in MENU 4, and each unit of the image frame can be displayed in MENU 5.

When the GUI unit 100 directs the system control unit 107 to display the menu screen, the system control unit 107 controls the recording and reproducing processing unit 205 and the medium control unit 207 on the basis of the management information, reads out the thumbnail image data of each content displayed on the menu screen from the disk 206 in order, and accumulates the data in the memory 108. After the thumbnail image data accumulated in the memory 108 is expanded by the compression and expansion processing unit 204, the expanded thumbnail image data is transmitted to the GUI unit 100. The menu generation unit 104 generates the menu screen by using the thumbnail image data.

STEPs S1003 and S1004: From Reproduction Start Point to Prereproduction Processing The reproduction start point is selected from the menu screen generated by the menu generation unit 104.

Figure 9:
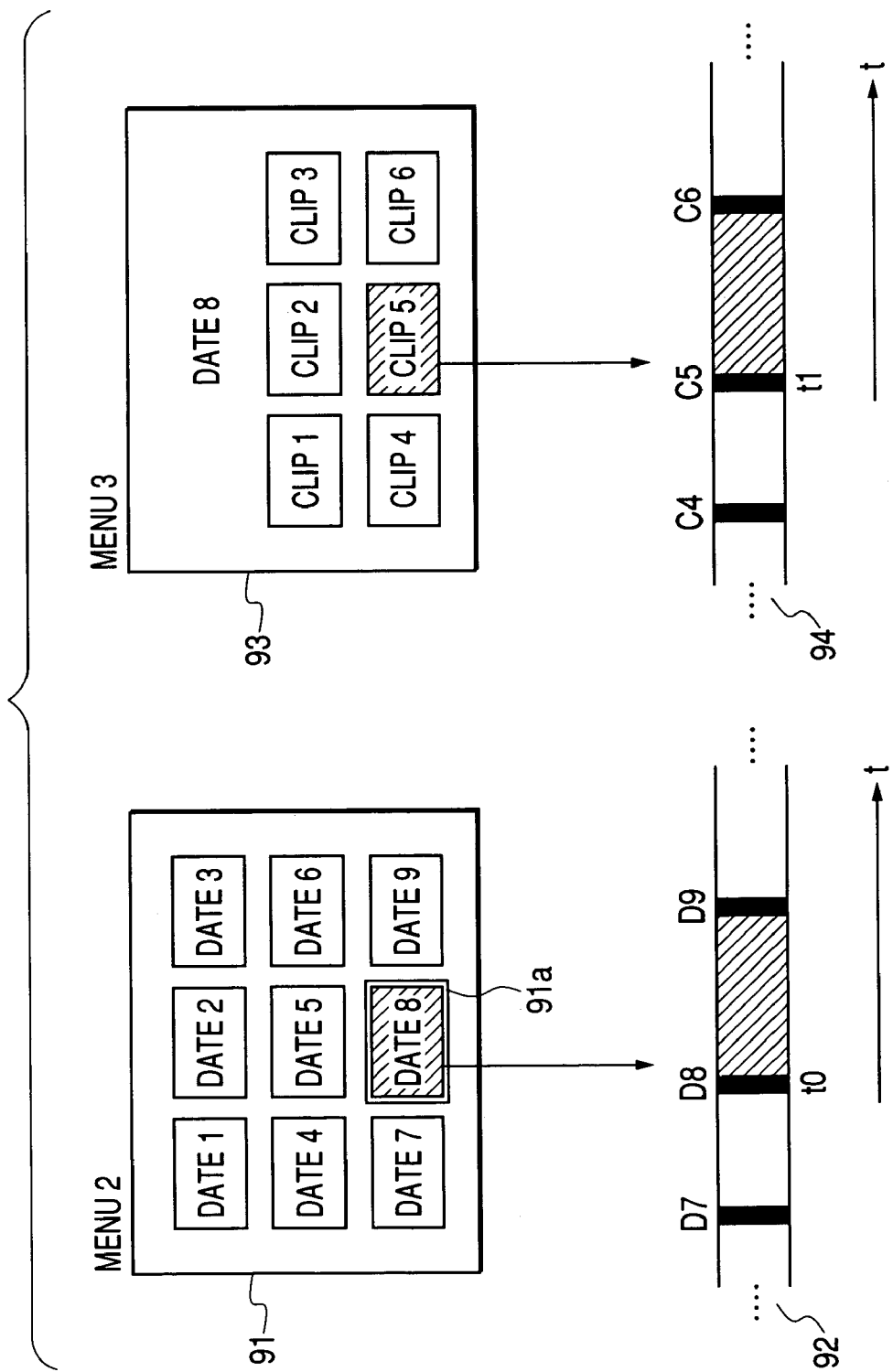
FIG. 9 is a view for explaining a method of selecting a reproduction start point.

Referring to FIG. 9, a method of selecting the reproduction start point will be described.

A reference numeral 91 shown in FIG. 9 denotes the menu screen of MENU 2 in the GUI unit 100. The predetermined thumbnail images representing each group by unit of the date and time are displayed in the screen 91 of MENU 2. The user can select the thumbnail image of arbitrary group by moving a cursor 91a with the GUI unit 100.

For example, when the user selects the thumbnail of DATE 8 as the reproduction start point as shown in FIG. 9, the selection unit 102 outputs the selection signal, the prereproduction processing unit 105 instructs the system control unit 107 to perform the prereproduction processing. As shown in a reference numeral 92 shown in FIG. 9, the system control unit 107 reproduces the data from the front end (time t0) of the image data in the group of DATE 8 in order of time series by controlling the recording and reproducing processing unit 205 and the medium control unit 207, and write the data in the memory 108.

During displaying the screen of MENU 2, MENU 2 can be transferred to a screen 93 of MENU 3 of the further lower hierarchy. The thumbnail images of all the clips included in the group of DATE 8 can be also displayed on the display screen of MENU 3 to select the thumbnail of the desired clip from the list of the thumbnail images.

For the prereproduction processing in STEP S1004, for example, only the predetermined data amount "a" is written in the prereproduction area of the memory 108 by reading out the image data included in the group of DATE 8 recorded in the disk 206 in order from the front end of the image data.

The processing of selecting the reproduction start point in STEP S1003 is one, in which the cursor is moved by the selection unit 102 to select one of the currently displayed thumbnail images. Therefore, when update of the menu hierarchy is instructed by the selection unit 102, the prereproduction processing returns to STEP S1002 and the updated menu is displayed in list form.

STEPs S1005 and S1006: Data Readout by Decision (Determination) of Reproduction Start Point When the reproduction start point is decided (determined) by the decision unit 103 of the GUI unit 100, the reproduced data from the reproduction start point which is accumulated in the prereproduction area of the memory 108 is read out in order.

At this point, the user decides the reproduction start by operating a reproduction start key or the like after the user selects the thumbnail image by moving the cursor on the menu screen. The decision unit 103 detects the operation of the reproduction start key or the like and instructs the reproduction start.

As shown in FIG. 4, after starting the reproduction, the data is read out from the prereproduction area of the memory 108 and expanded by the compression and expansion processing unit 204, and the subsequent reproduced data is newly written and replenished at the time when the amount of reproduced data stored in the memory 108 is decreased to b.

STEP S1007: Video Display and External Output

The video output processing unit 109 not only displays the expanded image data, the operating status of the image pickup recording and reproducing apparatus 200, and the like on the screen of the GUI unit 100, but also outputs the expanded image data, the operating status of the image pickup recording and reproducing apparatus 200, and the like to the external output terminal on the basis of the predetermined output format.

As described above, in the first embodiment, the menu screen showing the list of the thumbnail images such as the groups and the clips, which indicate the position capable of starting the reproduction, is displayed on the screen of the GUI unit 100. When one of the thumbnail images displayed on the menu screen is selected, the prereproduction processing, in which the front-end part of the image data concerning the selected thumbnail image is immediately read out from the disk 206 and stored in the memory 108 before the prereproduction start instruction of the selected image data is provided, is performed.

Accordingly, the prereproduction can be started rapidly and correctly from the desired position in the moving image data recorded on the disk 206. In this case, it is not necessary to prepare the large-capacity memory as the memory 108, namely the buffer memory for the prereproduction.

In other words, the desired data recorded on the disk-shaped recording medium can be rapidly and correctly reproduced and output by using the small-capacity memory.

Second Embodiment

In the first embodiment, the selected image data is pre-reproduced at the time when one of the plurality of thumbnail images displayed on the menu display screen is selected. However, in a second embodiment, the image data concerning the whole thumbnail images displayed on the menu screen is pre-reproduced at the time when the menu screen is displayed.

Figure 10:
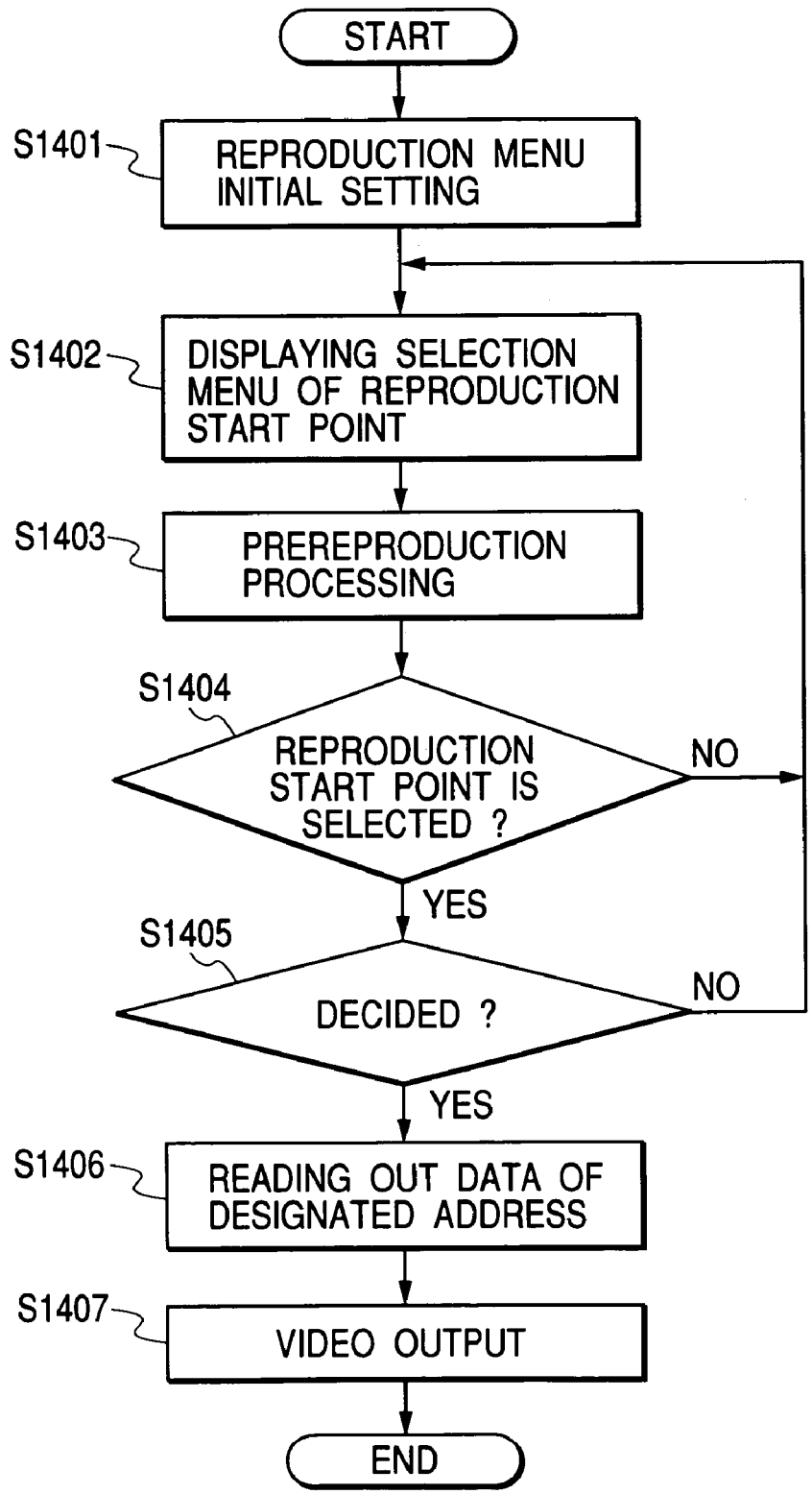
FIG. 10 is a flow chart showing the prereproduction processing in a second embodiment.

The prereproduction processing in the second embodiment will be described below referring to the flow chart shown in FIG. 10.

STEP S1401: Setting Initial Value in Menu Generation Unit 104

STEPs S1402 and S1403: From Prereproduction Processing to Reproduction Start Point Selection Menu Display An example of the operation of the prereproduction processing unit 105 of the embodiment will be described referring to FIG. 11.

Figure 11:
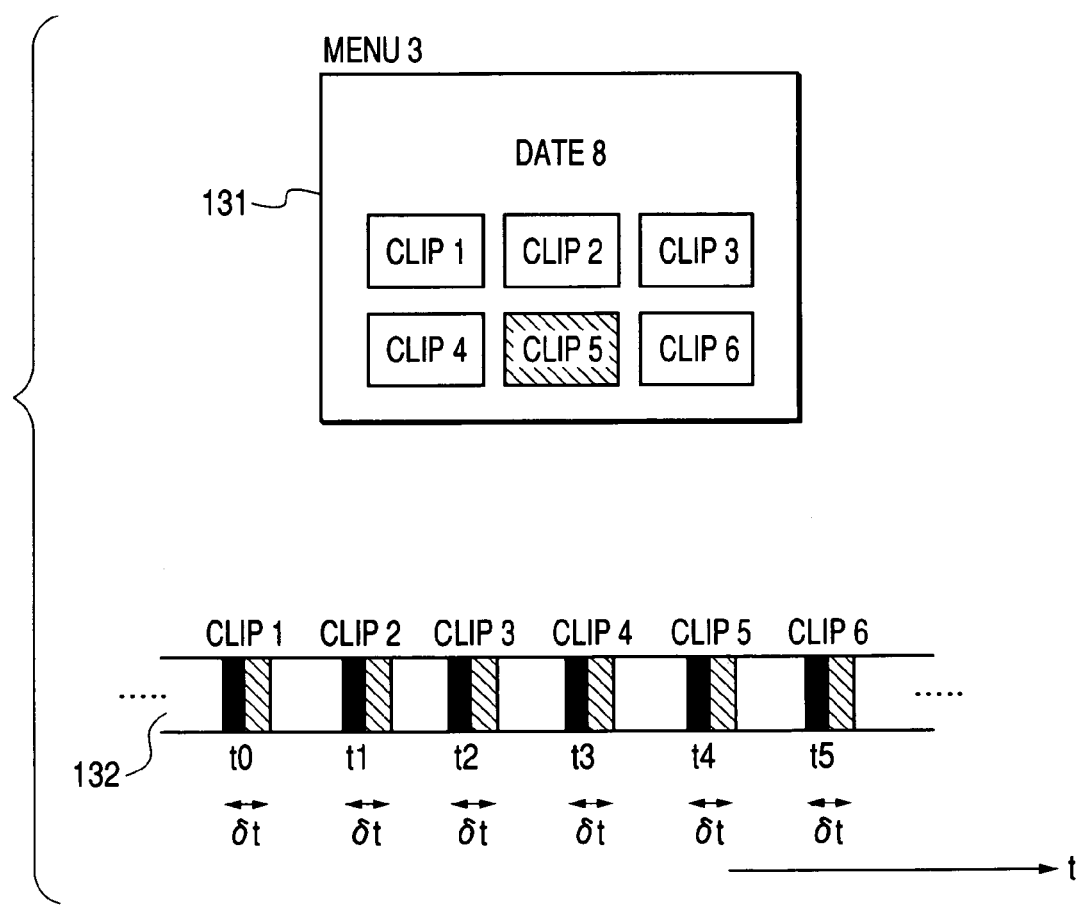
FIG. 11 is a view for explaining the reproduction start point in the second embodiment.

A reference numeral 131 shown in FIG. 11 denotes the display screen of MENU 3. The thumbnail images of the picture clips included in the group of a date (DATE 8) are displayed in list form in the screen 131 of MENU 131. A reference numeral 132 denotes the states of the target data of the prereproduction processing in order of time series when the menu screen 131 is displayed.

Each data at the time t0, t1, . . . , t5 shown in 132 of FIG. 11 is the video data of the front end of each clip displayed on the menu screen 131. In this case, each image data of δt minute is pre-reproduced from the front end of each clip (from CLIP 1 to CLIP 6) displayed on the display unit 101 of the GUI unit 100.

The above-mentioned prereproduction processing is executed in the present embodiment, when a change signal (hierarchy selection signal) of the menu hierarchy is output by the operation of the selection unit 102 or when the menu of an uppermost layer is displayed after the reproduction menu initial setting.

Figure 12:
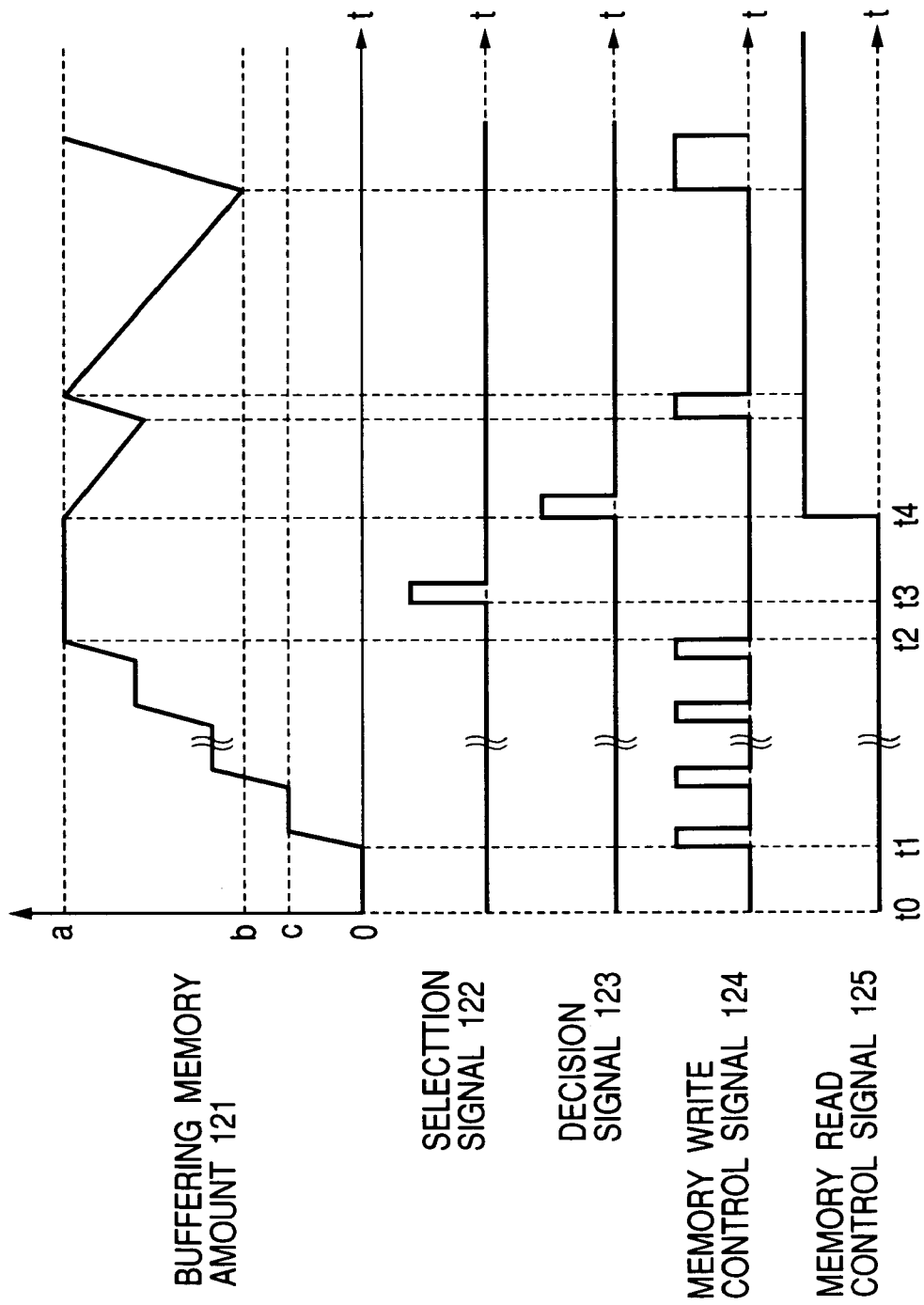
FIG. 12 is a timing chart showing the prereproduction processing in the second embodiment.

FIG. 12 shows transition of the data stored in the prereproduction area of the memory 108 in the second embodiment. In FIG. 12, a reference numeral 121 denotes time transition of the data amount in the memory 108, a reference numeral 122 denotes a selection signal obtained from the selection unit 102 of the GUI unit 100, a reference numeral 123 denotes a decision signal obtained from the decision unit 103 of the GUI unit 100, a reference numeral 124 denotes a data write control signal supplied to the memory control unit 106, and a reference numeral 125 denotes a data read control signal supplied to the memory control unit 106.

At the time to, when the change signal (hierarchy selection signal) 122 of the menu hierarchy is output by the operation of the selection unit 102 or when the selection signal 122 of the menu hierarchy of the uppermost layer is output after entering the reproducing mode, the prereproduction processing unit 105 provides the instruction so as to reproduce the image data concerning the whole thumbnail images displayed on the menu screen of the display unit 101 by δt minute from each front end. The system control unit 107 controls the recording and reproducing processing unit 205 and the medium control unit 207 to reproduce sequentially the front-end part of each image data from the time t0 to the time t2 and writes the front-end part of each image data in the memory 108.

In this case, as denoted by the reference numeral 124, the write control signal to the prereproduction area of the memory 108 is repeatedly output for the image data concerning the whole thumbnail images displayed on the menu screen, and each target data is sequentially reproduced by the data amount "c" from the front end in a time period from the time t1 to the time t2 and each target data having the data amount "c" is accumulated in the memory 108.

The system control unit 107 is switched to a standby state after completing the accumulation of the whole prereproduction data into the memory 108.

The setting time δt is determined by the number of thumbnail images displayed on the menu screen (reproduction start contents) and the amount "a" of target buffering memory stored in the prereproduction area of the memory 108, and the pre-reproduced data amount "c" of each image data is expressed as follows:

Prereproduction data amount "c" of each image data=Target buffer amount "a"/Number of menu screen display clips (Number of selectable target data)

STEPs S1404 to S1406: Reproduction of Image Data by Selection and Decision of Reproduction Start Point When the desired thumbnail image (reproduction start point) is selected by the selection unit 102 of the GUI unit 100 and the reproduction start point is decided by the decision unit 103, the image data corresponding to the selected thumbnail image (contents) among the image data accumulated in the prereproduction area of the memory 108 is sequentially read out from the front end to be output to the compression and expansion processing unit 204.

The transition of the prereproduction area of the memory 108 in this case will be described referring to FIG. 12 again.

In FIG. 12, when the prereproduction processing unit 105 receives the selection signal 122 from the GUI unit 100 at the time t3 and receives the decision signal 123 at the time t4, the prereproduction processing unit 105 instructs the system control unit 107 to read out the image data from the designated reproduction start point (contents) among the image data accumulated in the prereproduction area of the memory 108. The system control unit 107 instructs the memory control unit 106 to read out the image data from the reproduction start point from the prereproduction area of the memory 108. The memory control unit 106 reads out the image data from the reproduction start point from the prereproduction area of the memory 108 on the basis of the memory read control signal 125, and outputs the image data to the compression and expansion processing unit 204.

In this case, the image data after the reproduction start point is the image data of the contents corresponding to the thumbnail image selected by the selection unit 102, and the image data of other contents accumulated in the prereproduction area of the memory 108 is not read out.

Then, as shown in the memory write signal 124 and the memory read signal 125, the system control unit 107 reproduces the image data after the front-end part stored in the prereproduction area of the memory 108 from the disk 206 at the time when the reproduction start point is decided, and outputs the image data to the compression and expansion processing unit 204 while accumulating the image data in the memory 108.

STEP S1407: Video Display and External Output

While the video output processing unit 109 displays the image data reproduced in the above-mentioned way on the display unit 101 of the GUI unit 100, the video output processing unit 109 outputs the external output terminal on the basis of the predetermined output format.

As described above, in the second embodiment, the data of the front-end part of the whole contents concerning each thumbnail images displayed on the menu screen is pre-reproduced and stored in the memory 108 at the time when the menu screen is displayed, so that the same effect as the first embodiment can be obtained and the desired data can be reproduced more rapidly than the first embodiment.

Third Embodiment

In a third embodiment, the front-end part of the image data of the clip having the highest priority is pre-reproduced according to the predetermined reproducing condition, when the reproduction is decided under the predetermined condition.

Figure 13:
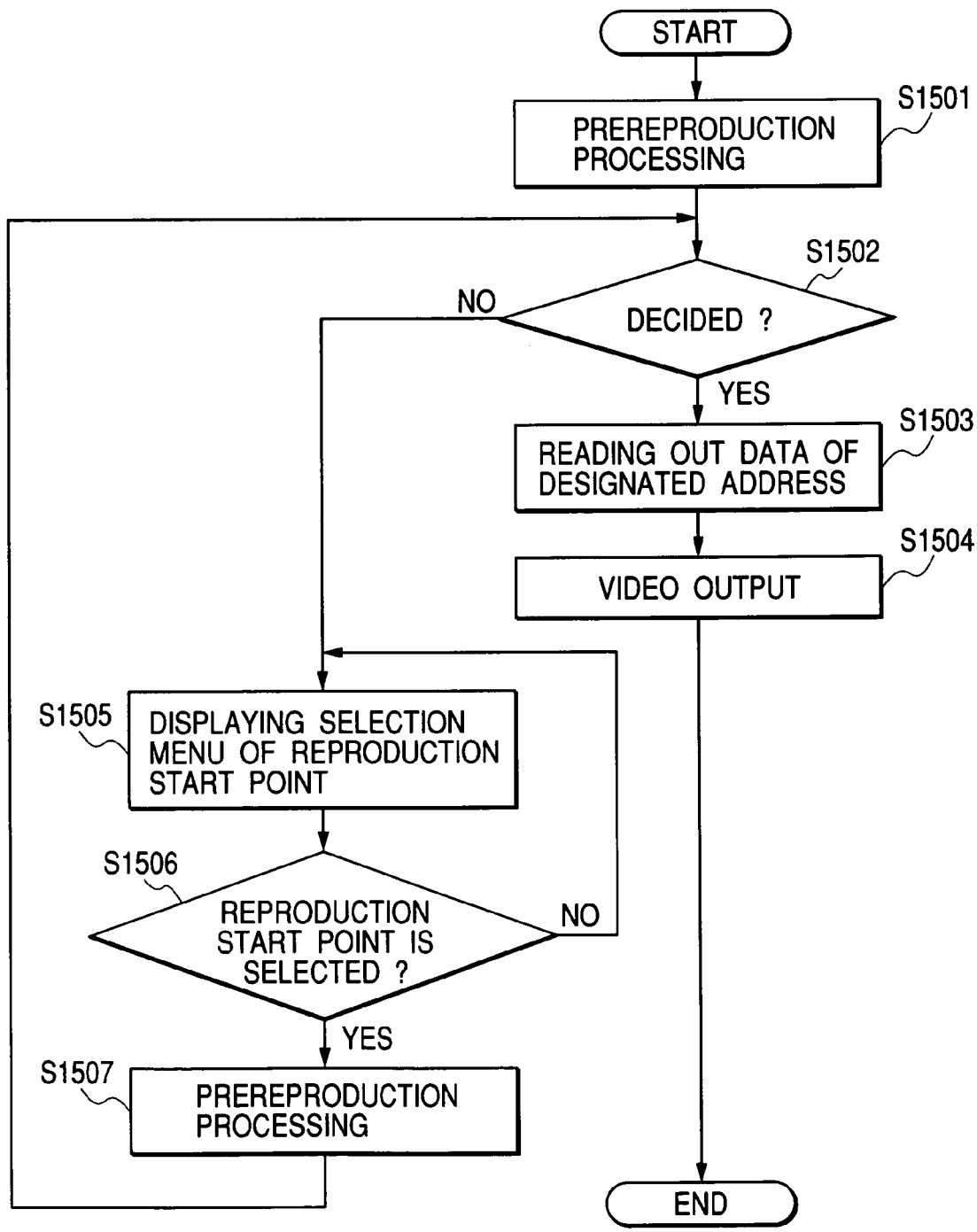
FIG. 13 is a flow chart showing the prereproduction processing in a third embodiment.

The prereproduction processing in the third embodiment will be described below referring to a flow chart shown in FIG. 13.

STEP S1501: Executing Prereproduction Processing

For example, in the case the reproducing mode is set by a mechanical reproducing button (not shown) while the disk 206 in which overwrite disabling processing has been done is mounted on the image pickup recording and reproducing apparatus 200, the prereproduction processing unit 105 instructs the system control unit 107 to pre-reproduce the data of the clip having the highest priority in the clips recorded in the disk 206 by the predetermined amount from the front end, e.g. the data amount "a" shown in FIGS. 4 and 12 according to the predetermined reproducing condition.

The reproducing condition which generates the data in order from the oldest updated date is set in the present embodiment, and the front end part of the picture clip having the oldest date in the picture clips recorded in the disk 206 is pre-reproduced.

When the system control unit 107 receives the prereproduction instruction, the system control unit 107 controls the recording and reproducing processing unit 205 and the medium control unit 207 based on the management information of the disk-shaped recording medium 206 to reproduce the data of the clip having the oldest date by the data amount "a" from the front end, and accumulates the data in the prereproduction area of the memory 108.

STEPs S1502 to S1504: Reproduction Output

When the decision unit 103 of the GUI unit 100 decides the reproduction start in the above state, the data of the front-end clip accumulated in the prereproduction area of the memory 108 by the prereproduction processing in STEP S1501 is read out to output the data to the compression and expansion processing unit 204.

After reproducing and outputting the data of the front-end part accumulated in the prereproduction area of the memory 108 by the predetermined amount, the system control unit 107 controls the recording and reproducing processing unit 205 to perform the reproduction while reproducing sequentially the remaining of the image data of the front-end clip to accumulate the data in the memory 108. When the reproduction of the front-end clip is completed, the reproduction is performed while reproducing sequentially the data of the clip having the second oldest update date and the data of the clip having the third oldest update date to accumulate the data in the memory 108.

STEPs S1505 to S1510: From Reproduction Start Point Selection to Prereproduction Processing When the instruction of the reproduction start is absent and the instruction of the menu screen display is present in STEP S1502, the menu screen is displayed in the same way as the first embodiment, the image data selected from among the thumbnail images displayed on the menu screen is pre-reproduced, and the reproduced data is output in response to the decision (determination) operation.

Since the processing from STEP S1505 to STEP S1510 is completely the same as the processing from STEP S1002 to S1007 in the first embodiment shown in FIG. 5, the detail description will be omitted.

However, when the prereproduction processing is performed in STEP S1507, the data of the contents with respect to the selection is pre-reproduced by erasing or overwriting the data stored in the prereproduction area of the memory 108 through the prereproduction processing in STEP S1501.

As described above, in the third embodiment, the data of the front-end part of the front-end clip having the highest priority depending on the predetermined reproducing condition is pre-reproduced according to the setting of the reproducing mode, so that the reproduction of the image of the front-end clip can be rapidly started even if the reproduction instruction is provided without displaying the menu screen.

In the embodiment, the user can arbitrarily set the reproducing condition by operating the GUI unit 100. For example, the clip having the oldest date was set to the front-end clip in the above description. However, instead of the above description, the clip having the latest recording date can be also set to the front-end clip and its front-end part can be pre-reproduced.

When the user changes the reproducing condition, the system control unit 107 detects the changed reproducing condition, e.g. the clip having the latest recording date on the basis of the management information of the disk 206, reproduces the image data by the predetermined data amount from the front-end part of the front-end clip, and accumulates the data in the memory 108.

The invention is not limited to the above-described embodiment. For example, similarly to the second embodiment, the front-end part of the predetermined number of contents among the contents displayed on the menu screen may be pre-reproduced without reproducing the data of the front-end part of the whole contents displayed on the menu screen.

The above embodiments are in consideration of the data which has a meaning when it is time-series recorded and reproducted, i.e. the case in which particularly the moving image data is recorded and reproduced. However, the embodiments is also applicable to the data except the moving image data, which also has a meaning what it is time-series recorded and reproduced, such as music data.

The objects of the invention can be achieved in such a manner that the storage medium storing program code of software realizing the functions of the host and the terminals of the first embodiment to the third embodiment is supplied to the system or the apparatus and the computer (or CPU or MPU) of the system or the apparatus reads out and executes the program code stored in the storage medium.

In this case, the program code itself read out from the storage medium realizes the functions of the first embodiment to the third embodiment, and the program code and the storage medium storing the program code constitute the invention.

ROM, a flexible disk, a hard disk, an optical disk, the magneto-optical disk, CD-ROM, CD-R, magnetic tape, non-volatile memory card, and the like can be used as the storage medium for supplying the program code.

The functions of the first embodiment to the third embodiment are realized by executing the program code read out with the computer. Further, the invention includes the case in which an operating system and the like running on the computer perform a part or the whole of the actual processing on the basis of the direction of the program code and the functions of the first embodiment to the third embodiment are realized by the processing of the operating system and the like.

Further, the invention also includes the case in which, after the program code read out from the recording medium is written in the memory included in an extended function board inserted in the computer or an extended function unit connected to the computer, CPU or the like included in the extended function board or the extended function unit performs a part of or the whole of actual processing on the basis of the direction of the program code and the functions of the first embodiment to third embodiment are realized by the processing.

Figure 14:
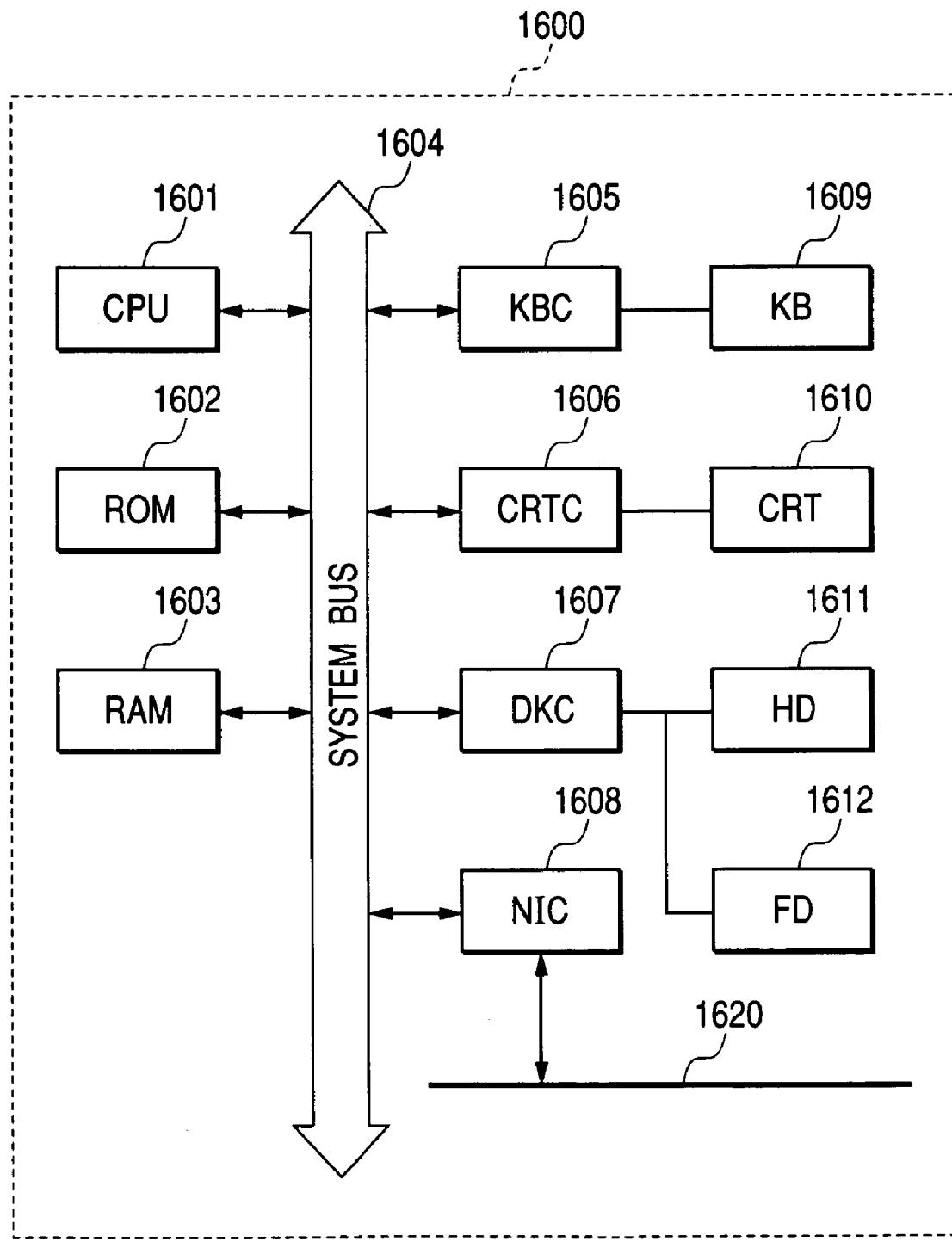
FIG. 14 is an explanatory view of computer function to which the invention can be applied.
Figure 15:
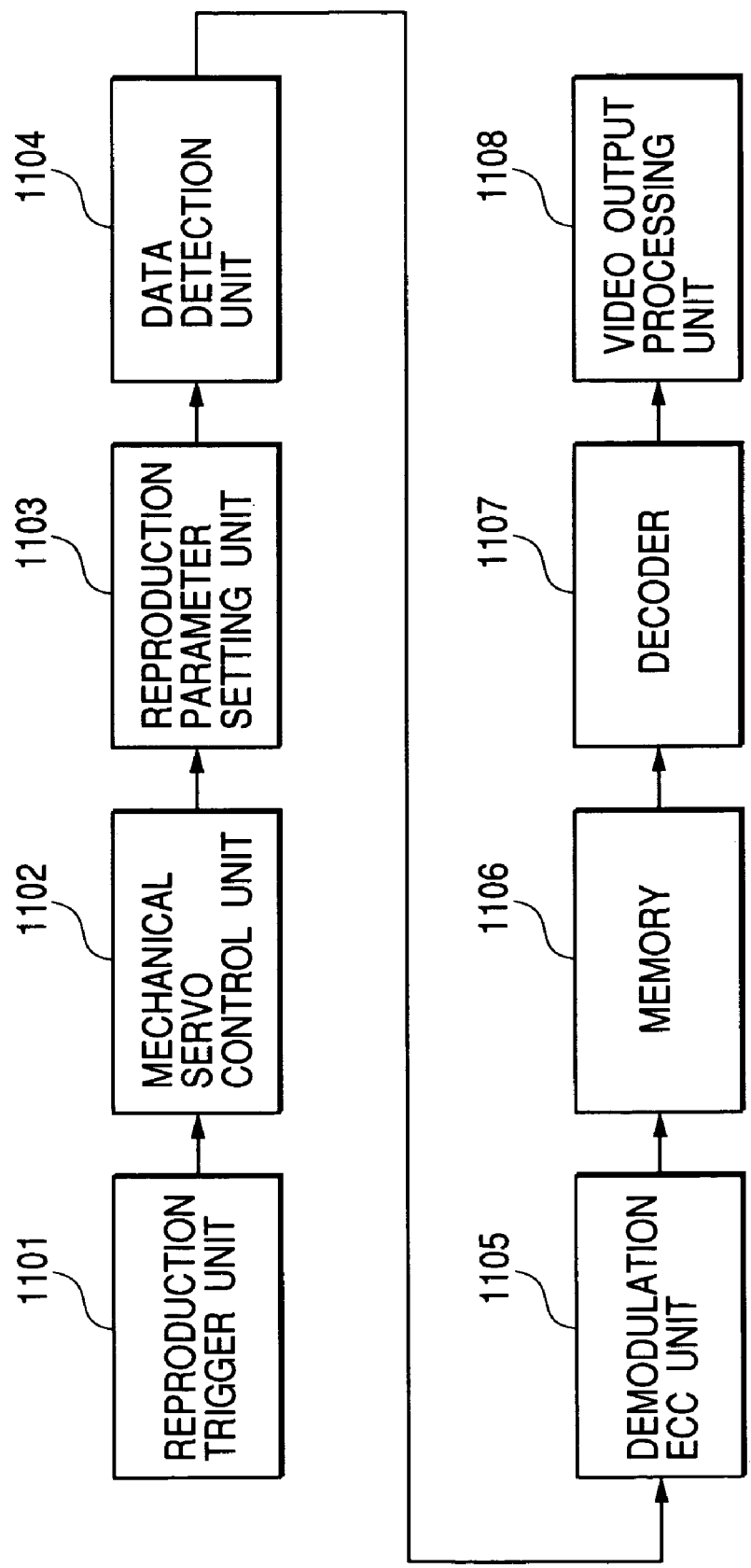
FIG. 15 is an explanatory view of a conventional disk reproduction processing.
Figure 16:
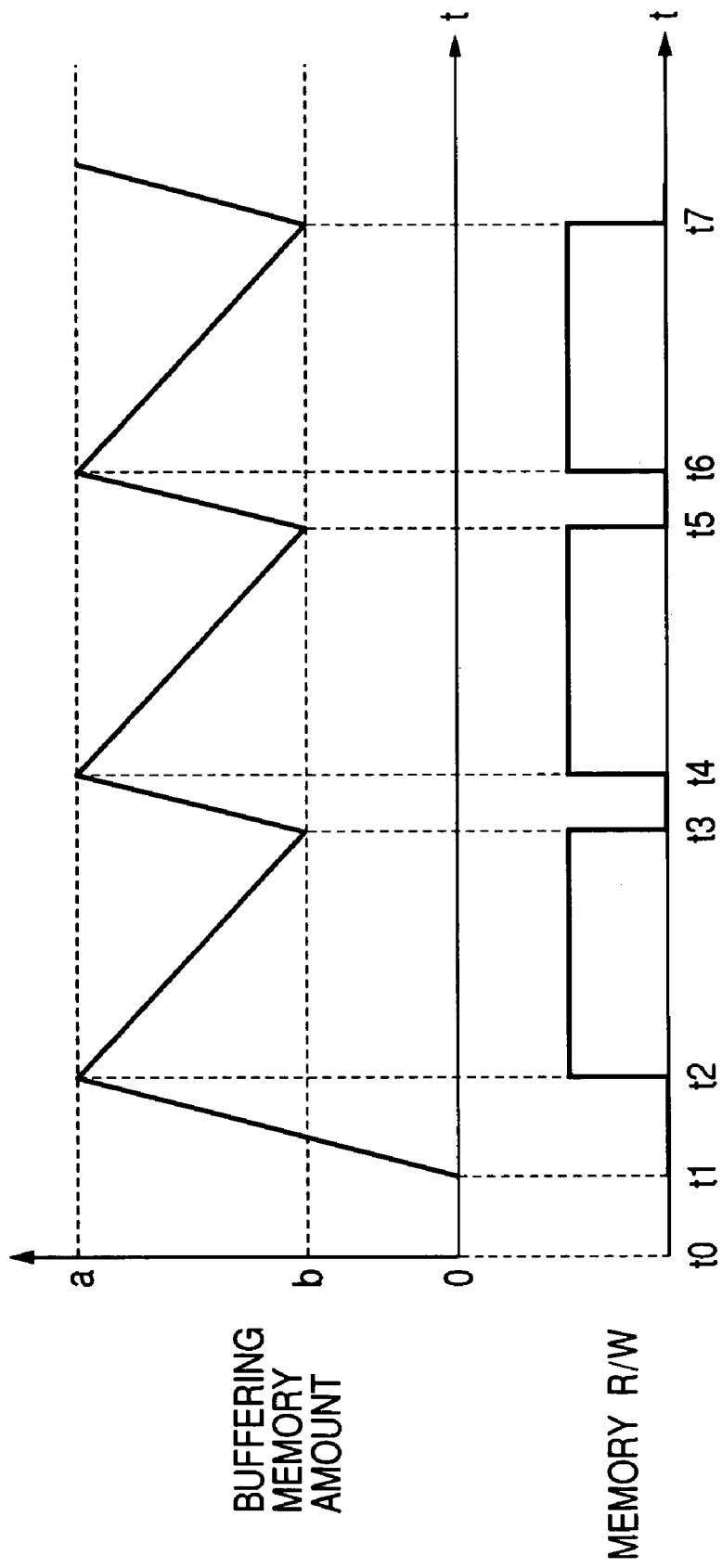
FIG. 16 is an explanatory view of memory access operation in the conventional reproduction.

FIG. 14 shows function 1600 of the above-mentioned computer.

As shown in FIG. 14, the computer function 1600 has the configuration in which CPU 1601, ROM 1602, RAM 1603, a keyboard controller (KBC) 1605 of a keyboard (KB) 1609, a CRT controller (CRTC) 1606 of a CRT display (CRT) 1610 as the display unit, a disk controller (DKC) 1607 of a hard disk (HD) 1611 and a flexible disk (FD) 1612, and a network interface controller (NIC) 1608 for connection to a network 1620 are communicatably connected to one another through a system bus 1604.

CPU 1601 controls each component unit connected to the system bus 1604 by executing the software stored in ROM 1602 or HD 1611 or the software supplied from the flexible disk 1612. That is to say, CPU 1601 performs the control for realizing the operations in the first embodiment to the third embodiment by reading out a processing program obeying a predetermined processing sequence from ROM 1602, HD 1611, or FD 1612 and executing the processing program.

RAM 1603 functions as a main memory or a work area of CPU 1601. KBC 1605 controls an instruction input from KB 1609, a pointing device (not shown), or the like. CRTC 1606 controls the display of CRT 1610. DKC 1607 controls access to HD 1611 and FD 1612 which store a boot program, various applications, an edit file, a user file, a network management program, the predetermined processing programs in the first embodiment to the third embodiment, and the like. NIC 1608 bi-directionally exchanges the data with the apparatus or the system on the network 1620.

When the operations in the first embodiment to the third embodiment are realized, as mentioned above, the selection unit 102 and the decision unit 103 in the GUI unit 100 can realize the function by the direction input from a mouse cursor (not shown), the pointing device, or the like.

Further, it is obvious that a plurality of data reproducing processing processes are possessed and the operations in the first embodiment to the third embodiment can be realized by pipeline processing.

Many widely different embodiments of the present invention may be constructed without departing from the spirit and scope of the present invention. It should be understood that the present invention is not limited to the specific embodiments described in the specification, except as defined in the appended claims.

What is claimed is:

1. A reproducing apparatus comprising:

reproducing means for (1) reproducing from a recording medium (a) moving image data of a plurality of contents and (b) management information which is different from the moving image data and which indicates addresses of the recording medium where the moving image data of the plurality of contents are recorded and (2) writing the reproduced moving image data in a memory;

displaying means for displaying a plurality of representative images of the plurality of contents on the same screen;

selecting means for selecting a desired representative image from among the plurality of representative images displayed on the same screen;

reproduction instruction means for instructing reproduction start of the contents independently of a selecting operation by the selecting means;

reproduction processing means for reading out the moving image data stored in the memory and outputting the moving image data as reproduced moving image data; and controlling means for effecting control of the reproducing means and the reproduction processing means so that in response to the selecting operation by the selecting means when the plurality of representative images are displayed by the displaying means before the reproduction start instruction by the reproduction instructions means, the reproducing means reproduces a predetermined amount of the moving image data of the contents concerning the selected representative image to write the predetermined amount of the reproduced moving image data in the memory and the reproduction processing means does not effect reading out the written predetermined amount of the moving image data from the memory, the controlling means further controlling the reproduction processing means so that the reproduction processing means starts readout of the predetermined amount of the moving image data from the memory in response to the reproduction start instruction by the reproduction instruction means, wherein the moving image data includes a plurality of clips each showing series of moving images, and each of the plurality of contents includes the plurality of clips belonging to the same group.

2. An apparatus according to claim 1, wherein the moving image data includes a plurality of clips each showing series of moving images, and each of the plurality of contents includes each one of the clips.

3. An apparatus according to claim 1, wherein the displaying means generates a plurality of display hierarchies including the contents different from one another, and switches the representative image to be displayed, between the display hierarchies.

4. An apparatus according to claim 3, wherein the controlling means controls the reproducing means in response to the switching among the display hierarchies displayed by the displaying means so that the reproducing means reproduces the predetermined amount of the moving image data of the content selected from among the plurality of contents of the display hierarchy newly displayed.

5. An apparatus according to claim 1, wherein the controlling means further controls the reproducing means in response to the reproduction start instruction so that the reproducing means starts the data reproduction of the data from the predetermined amount of the moving image data in the selected contents and writes the data from the predetermined amount of the moving image data in the memory.

6. An apparatus according to claim 1, wherein the controlling means controls the reproducing means in response to the selecting operation by the selecting means so that the reproducing means reproduces the moving image data of the predetermined amount from a front end of the selected contents and writes the moving image data in the memory.

7. A reproducing apparatus comprising:
reproducing means for (1) reproducing from a recording medium (a) moving image data of a plurality of contents and (b) management information which is different from the moving image data and which indicates addresses of the recording medium where the moving image data of the plurality of contents are recorded and (2) writing the reproduced moving image data in a memory;

displaying means for displaying a menu screen including a plurality of representative images of the plurality of contents on a display apparatus;

selecting means for selecting a desired representative image from among the plurality of representative images displayed on the menu screen;

reproduction instruction means for instructing reproduction start of the contents independently of a selecting operation by the selecting means;

reproduction processing means for reading out the moving image data stored in the memory and outputting the moving image data as reproduced image data; and controlling means for controlling the reproducing means so that when the menu screen is being displayed by the displaying means before the reproduction start instruction by the reproduction instruction means, the reproducing means reproduces a predetermined amount of the moving image data of the contents concerning each of the plurality of representative images displayed on the menu screen to write the predetermined amount of each moving image data in the memory, the controlling means further controlling the reproduction processing means so that in response to the reproduction start instruction by the reproduction instruction means, the reproduction processing means reads out and outputs, from among the predetermined amount of the moving image data of the plurality of contents stored in the memory, the predetermined amount of the moving image data of the contents concerning the selected representative images.

8. An apparatus according to claim 7, wherein the displaying means displays the representative image in response to a display instruction of the representative image, and the controlling means controls the reproducing means in response to the display instruction of the representative picture so that the reproducing means reproduces the predetermined amount of each moving image data of the contents concerning the plurality of representative images displayed on the same screen by the displaying means and writes the predetermined amount of each moving image data in the memory.

9. An apparatus according to claim 7, wherein the moving image data includes a plurality of clips each showing series of moving images, and each of the plurality of contents includes one of the clips.

10. An apparatus according to claim 7, wherein the moving image data includes a plurality of clips each showing series of moving images, and each of the plurality of contents includes the plurality of clips belonging to the same group.

11. An apparatus according to claim 7, wherein the displaying means generates a plurality of display hierarchies including the contents different from one another, and switches the representative image to be displayed, between the display hierarchies.

12. An apparatus according to claim 7, wherein the controlling means controls the reproducing means in response to the switching of the menu screen so that the reproducing means reproduces a predetermined amount of the moving image data from the head of the each of the plurality of contents corresponding respectively to the plurality of representative images displayed on a post-switching menu screen.

13. An apparatus according to claim 7, wherein the controlling means further controls the reproducing means in response to the reproduction start instruction so that the reproducing means starts the data reproduction of the data from the predetermined amount of the moving image data in the selected contents and writes the data from the predetermined amount of the moving image data in the memory.

14. An apparatus according to claim 7, wherein the predetermined amount is decided on the basis of data capacity of the memory and the number of screens of the representative images displayed on the same screen, and wherein the controlling means controls the reproducing means so that the reproducing means reproduces the moving image data of the predetermined amount from a front end of the contents concerning the plurality of representative images respectively and stores the moving image data of the predetermined amount in the memory.

15. A reproducing apparatus comprising:

reproducing means for (1) reproducing from a recording medium (a) moving image data and (b) management information which is different from the moving image data and which indicates addresses of the recording medium where the moving image data of a plurality of contents are recorded and (2) writing the reproduced moving image data in a memory;

displaying means for displaying a menu screen including a plurality of representative images concerning a plurality of predetermined reproduction start positions in the moving image data recorded on the recording medium on a display apparatus;

selecting means for selecting a desired representative image from among the plurality of representative images displayed in the menu screen;

reproduction instruction means for instructing start of reproduction of the image data independently of a selecting operation by the selecting means;

reproduction processing means for reading out the moving image data stored in the memory and outputting the moving image data as reproduced image data; and controlling means for controlling the reproducing means so that when the menu screen is being displayed by the displaying means before the reproduction start instruction by the reproduction instruction means, the reproducing means reproduces the moving image data of a predetermined amount from each of the plurality of predetermined reproduction start positions to write the moving image data of the predetermined amount in the memory, the controlling means further controlling the reproduction processing means so that in response to the reproduction start instruction by the reproduction instruction means, the reproduction processing means starts to read out, from among the moving image data of the plurality of contents stored in the memory, the stored moving image data at the reproduction start position corresponding to the selected representative image.

* * * * *